US012379690B2

(12) United States Patent
Fukamachi et al.

(10) Patent No.: US 12,379,690 B2
(45) Date of Patent: Aug. 5, 2025

(54) DRUM CARTRIDGE INCLUDING FIRST MEMORY HAVING FIRST ELECTRICAL CONTACT SURFACE AND SECOND MEMORY HAVING SECOND ELECTRICAL CONTACT SURFACE AND PROCESS CARTRIDGE INCLUDING DEVELOPING CARTRIDGE AND THE DRUM CARTRIDGE

(71) Applicant: BROTHER KOGYO KABUSHIKI KAISHA, Nagoya (JP)

(72) Inventors: Yasuo Fukamachi, Nagoya (JP); Shinya Kusuda, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 18/530,432

(22) Filed: Dec. 6, 2023

(65) Prior Publication Data

US 2024/0103430 A1 Mar. 28, 2024

Related U.S. Application Data

(63) Continuation of application No. PCT/JP2022/022086, filed on May 31, 2022.

(30) Foreign Application Priority Data

Jun. 24, 2021 (JP) ................................ 2021-104530

(51) Int. Cl.
*G03G 21/18* (2006.01)

(52) U.S. Cl.
CPC ..... *G03G 21/1878* (2013.01); *G03G 21/1867* (2013.01); *G03G 21/1885* (2013.01)

(58) Field of Classification Search
CPC ......... G03G 21/1867–1892; G03G 2221/1823
See application file for complete search history.

(56) References Cited

U.S. PATENT DOCUMENTS 10,935,925 B2 3/2021 Yokoi et al.
2004/0120730 A1* 6/2004 Niimi .................. G03G 5/0564 430/59.5

(Continued)

FOREIGN PATENT DOCUMENTS

JP 2008-217044 A 9/2008
JP 2018-146829 A 9/2018

(Continued)

OTHER PUBLICATIONS

International Search Report issued in corresponding application PCT/JP2022/022086, competed on Jul. 13, 2022 and mailed on Aug. 2, 2022.

(Continued)

*Primary Examiner* — Carla J Therrien
(74) *Attorney, Agent, or Firm* — Merchant & Gould P.C.

(57) ABSTRACT

A drum cartridge includes: a drum frame; a photosensitive drum; a first memory; and second memory. A developing cartridge including a developing roller is attachable to the drum frame. The photosensitive drum is rotatable about a first axis extending in a first direction. The photosensitive drum is configured to contact the developing roller in a state where the developing cartridge is attached to the drum frame. The first memory has a first electrical contact surface. The first memory stores therein information related to the drum cartridge. The second memory has a second electrical contact surface different from the first electrical contact surface. The second memory stores therein information related to the developing cartridge. The first electrical contact surface and the second electrical contact surface are positioned at an outer surface of the drum frame.

19 Claims, 5 Drawing Sheets

(56) References Cited

U.S. PATENT DOCUMENTS

| | | | | |
|---|---|---|---|---|
| 2013/0183058 | A1 | 7/2013 | Won | |
| 2018/0314202 | A1 | 11/2018 | Yokoi | |
| 2019/0196394 | A1 | 6/2019 | Yabuki et al. | |
| 2019/0391529 | A1 | 12/2019 | Abe et al. | |
| 2020/0341428 | A1* | 10/2020 | Komatsu | G03G 21/10 |
| 2021/0063960 | A1 | 3/2021 | Itabashi | |
| 2021/0063961 | A1 | 3/2021 | Itabashi et al. | |

FOREIGN PATENT DOCUMENTS

| | | | |
|---|---|---|---|
| JP | 2018-189740 | A | 11/2018 |
| JP | 2019-117346 | A | 7/2019 |
| JP | 2021-39173 | A | 3/2021 |
| JP | 2021-39175 | A | 3/2021 |

OTHER PUBLICATIONS

International Preliminary Report on Patentability issued in corresponding International Patent Application No. PCT/JP2022/022086, Dec. 14, 2023.

* cited by examiner

DRUM CARTRIDGE INCLUDING FIRST MEMORY HAVING FIRST ELECTRICAL CONTACT SURFACE AND SECOND MEMORY HAVING SECOND ELECTRICAL CONTACT SURFACE AND PROCESS CARTRIDGE INCLUDING DEVELOPING CARTRIDGE AND THE DRUM CARTRIDGE

REFERENCE TO RELATED APPLICATIONS

This is a by-pass continuation application of International Application No. PCT/JP2022/022086 filed on May 31, 2022 which claims priority from Japanese Patent Application No. 2021-104530 filed on Jun. 24, 2021. The entire contents of the International Application and the priority application are incorporated herein by reference.

BACKGROUND ART

Conventionally, an electro-photographic type image-forming apparatus such as a laser printer, an LED printer, or the like is known in the art. The conventional image-forming apparatus includes a developing cartridge and a drum cartridge. The developing cartridge is attached to the drum cartridge. The drum cartridge to which the developing cartridge is attached is attached to the image-forming apparatus. Furthermore, the developing cartridge in the conventional image-forming apparatus includes a memory. The memory stores therein various information related to the developing cartridge.

SUMMARY

Recently, installation of a memory storing various information related to a drum cartridge on the drum cartridge is required as well as installation of a memory on a developing cartridge. In this case, it is common to install a memory on each of the developing cartridge and the drum cartridge.

On the other hand, as another means, a memory storing various information related to a developing cartridge and a memory storing various information related to a drum cartridge can be installed on the drum cartridge without installing a memory on the developing cartridge.

In view of the foregoing, it is an object of the present disclosure to provide a technique installing a memory storing various information related to a developing cartridge and a memory storing various information related to a drum cartridge on the drum cartridge without installing a memory on the developing cartridge.

In order to attain the above and other object, according to one aspect, the present disclosure provides a drum cartridge including: a drum frame; a photosensitive drum; a first memory; and a second memory. A developing cartridge including a developing roller is attachable to the drum frame. The photosensitive drum is rotatable about a first axis extending in a first direction. The photosensitive drum is configured to contact the developing roller in a state where the developing cartridge is attached to the drum frame. The first memory has a first electrical contact surface. The first memory stores therein information related to the drum cartridge. The second memory has a first electrical contact surface different from the first electrical contact surface. The second memory stores therein information related to the developing cartridge. The first electrical contact surface and the second electrical contact surface are positioned at an outer surface of the drum frame.

According to another aspect, the present disclosure also provides a process cartridge attachable to an image-forming apparatus. The process cartridge includes: a developing cartridge; and a drum cartridge. The developing cartridge includes a developing roller. The drum cartridge includes: a drum frame; a photosensitive drum; a first memory; and a second memory. The developing cartridge is attachable to the drum frame. The photosensitive drum is rotatable about a first axis extending in a first direction. The photosensitive drum is configured to contact the developing roller in a state where the developing cartridge is attached to the drum frame. The first memory has a first electrical contact surface. The first memory stores therein information related to the drum cartridge. The second memory has a second electrical contact surface different from the first electrical contact surface. The second memory stores therein information related to the developing cartridge. The first electrical contact surface and the second electrical contact surface are positioned at an outer surface of the drum frame.

According to the drum cartridge and the process cartridge of the present disclosure, a memory storing therein information related to the developing cartridge and a memory storing therein information related to the drum cartridge are installed on the drum cartridge. Hence the information related to the developing cartridge can be managed without installing a memory on the developing cartridge.

DESCRIPTION

Figure 1:
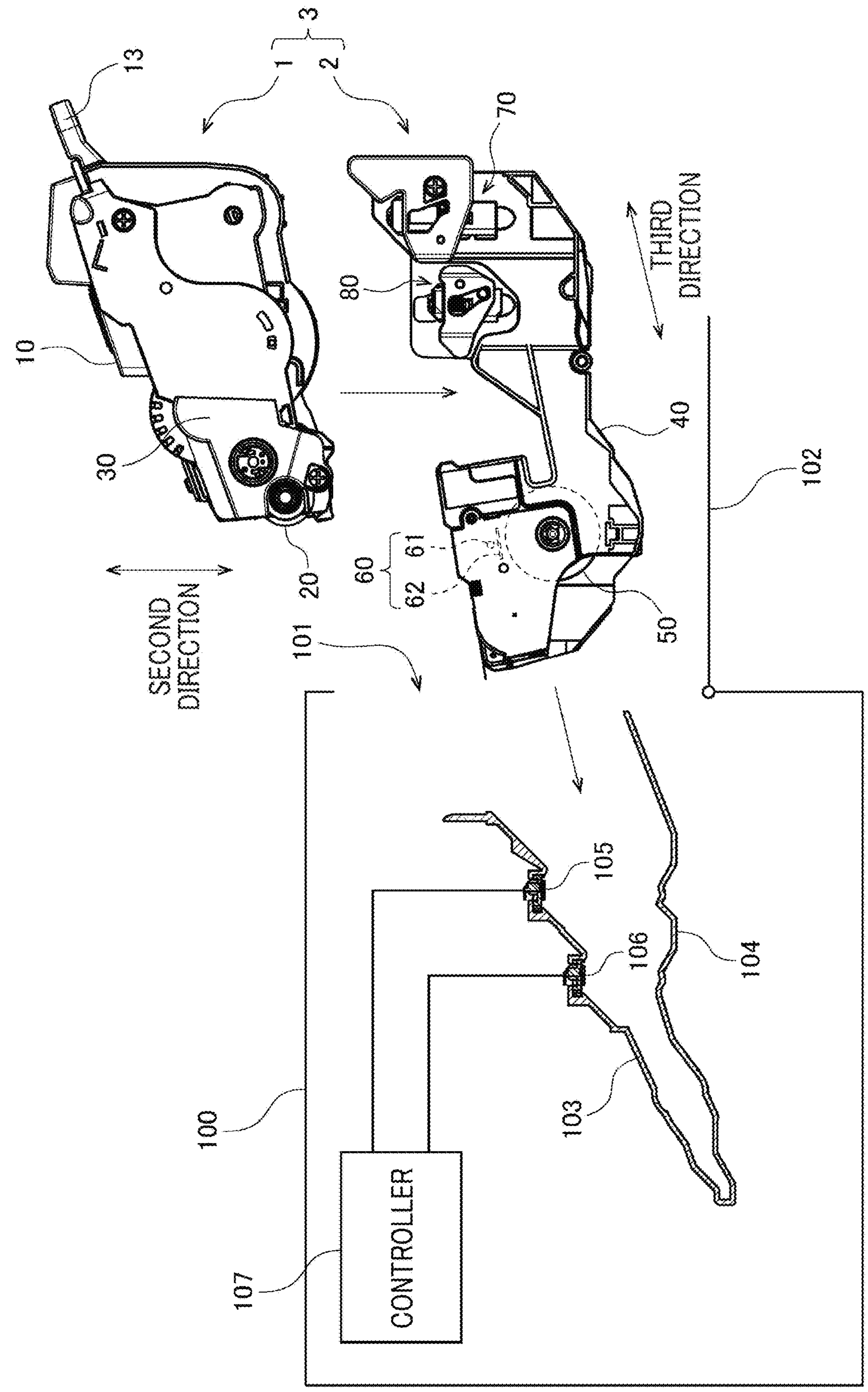
FIG. 1 is a view illustrating a developing cartridge, a drum cartridge and an image-forming apparatus.

Hereinafter, one embodiment of the present disclosure will be described while referring to the drawings.

Incidentally, in the following description, a direction in which a photosensitive drum extends will be referred to as “first direction”. Furthermore, a direction crossing a first electrical contact surface will be referred to as “second direction”. Furthermore, a direction in which one end of a drum frame at which the photosensitive drum is positioned and another end of the drum frame are arranged will be referred to as “third direction”. The first direction and the second direction cross each other (preferably, are perpendicular to each other). The first direction and the third direction cross each other (preferably, are perpendicular to each other). The second direction and the third direction cross each other.

<1. Overview of Developing Cartridge and Drum Cartridge>

Figure 2:
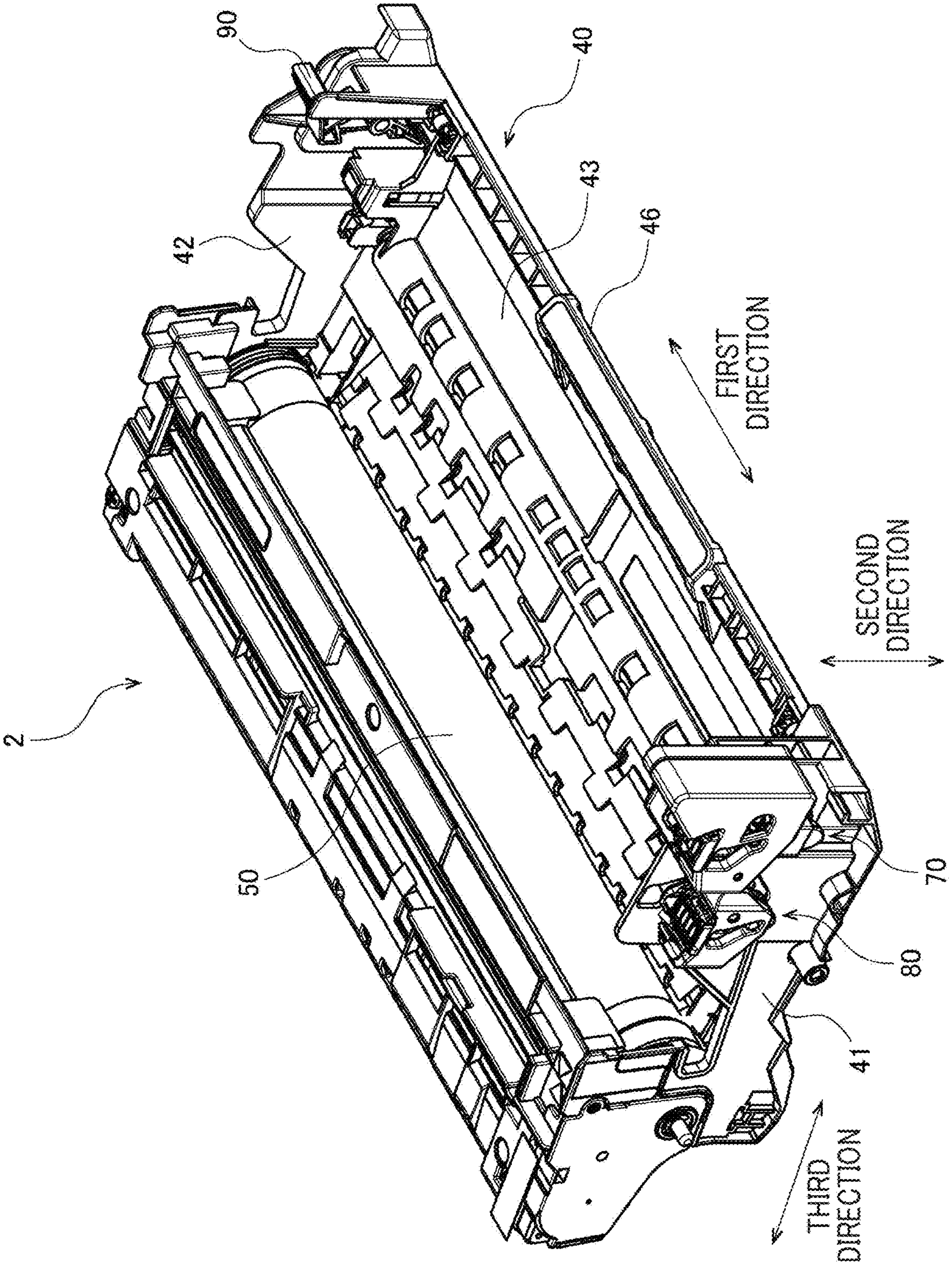
FIG. 2 is a perspective view of the drum cartridge.
Figure 3:
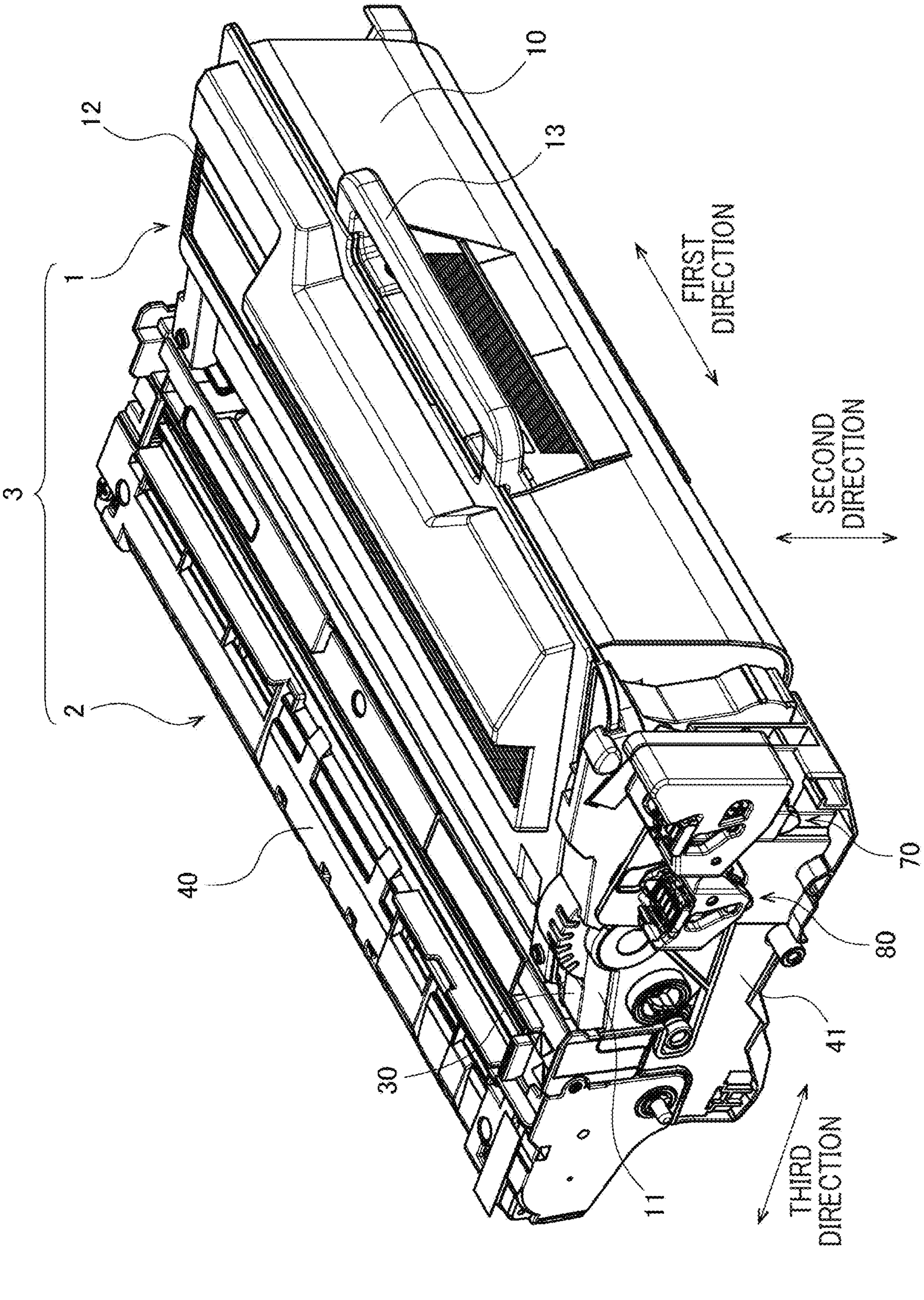
FIG. 3 is a perspective view of the drum cartridge to which the developing cartridge is attached.

FIG. 1 is a view illustrating a developing cartridge 1, a drum cartridge 2, and an image-forming apparatus 100. FIG. 2 is a perspective view of the drum cartridge 2. FIG. 3 is a perspective view of the drum cartridge 2 to which the developing cartridge 1 is attached.

The image-forming apparatus 100 is an electro-photographic type printer. The image-forming apparatus 100 is, for example, a laser printer or an LED printer. The developing cartridge 1 is attachable to and detachable from the drum cartridge 2. The drum cartridge 2 and the developing cartridge 1 attached to the drum cartridge 2 constitute a process cartridge 3. The process cartridge 3 is attachable to and detachable from the image-forming apparatus 100. The image-forming apparatus 100 forms images on printing sheets using toner supplied from the developing cartridge 1.

<2. Developing Cartridge>

As illustrated in FIGS. 1 and 3, the developing cartridge 1 includes a casing 10, a developing roller 20, and a gear portion 30. The casing 10 has a first outer surface 11 and a second outer surface 12. The first outer surface 11 is positioned at one end of the casing 10 in the first direction. The second outer surface 12 is positioned at another end of the casing 10 in the first direction. The first outer surface 11 and the second outer surface 12 are positioned away from each other in the first direction.

Developing agent is accommodated inside the casing 10. The developing agent is, for example, toner. The developing roller 20 is a roller that is rotatable about a rotation axis extending in the first direction. The developing roller 20 is positioned at one end of the casing 10 in the third direction. The developing agent in the casing 10 is supplied to the outer circumferential surface of the developing roller 20 through a supply roller (not illustrated). Hence, the developing agent is carried on the outer circumferential surface of the developing roller 20. Note that the developing cartridge 1 includes a handle 13 positioned at another end of the casing 10 in the third direction.

The gear portion 30 is positioned at the first outer surface 11 of the casing 10. The gear portion 30 includes a plurality of gears. In a state where the process cartridge 3 is attached to the image-forming apparatus 100, the image-forming apparatus 100 supplies driving force to the developing roller 20 through the plurality of gears of the gear portion 30, whereby the developing roller 20 rotates.

<3. Drum Cartridge>

As illustrated in FIGS. 1 through 3, the drum cartridge 2 includes a dram frame 40, a photosensitive drum 50, a scorotron-type charger 60, a first memory assembly 70, a second memory assembly 80, and a lock lever 90.

The drum frame 40 is a frame that supports the photosensitive drum 50. The drum frame 40 includes a first side frame 41, a second side frame 42, and a connection frame 43. The first side frame 41 is positioned at one end portion of the drum frame 40 in the first direction. The second side frame 42 is positioned at another end portion of the drum frame 40 in the first direction. The first side frame 41 and the second side frame 42 are positioned away from each other in the first direction.

The first side frame 41 expands in a direction crossing the first direction. That is, the first side frame 41 expands in the second direction and the third direction. The second side frame 42 expands in a direction crossing the first direction. That is, the second side frame 41 expands in the second direction and the third direction. The connection frame 43 connects the first side frame 41 and the second side frame 42 to each other in the first direction.

The developing cartridge 1 is attachable to and detachable from the drum frame 40. In a state where the developing cartridge 1 is attached to the drum frame 40, the developing cartridge 1 is positioned between the first side frame 41 and the second side frame 42 in the first direction. In a state where the developing cartridge 1 is attached to the drum frame 40, the first outer surface 11 of the developing cartridge 1 and the first side frame 41 of the drum cartridge 2 face each other in the first direction. Furthermore, in a state where the developing cartridge 1 is attached to the drum frame 40, the second outer surface 12 of the developing cartridge 1 and the second side frame 42 of the drum cartridge 2 face each other in the first direction.

The photosensitive drum 50 is a drum that is rotatable about a rotation axis (a first axis) extending in the first direction. The photosensitive drum 50 is positioned between the first side frame 41 and the second side frame 42 in the first direction. Furthermore, the photosensitive drum 50 is positioned at one end of the drum frame 40 in the third direction. The photosensitive drum 50 has a hollow cylindrical outer circumferential surface. The outer circumferential surface of the photosensitive drum 50 is coated with a photosensitive material. Note that the drum cartridge 2 includes a handle 46 positioned at another end of the drum frame 40 in the third direction.

In a state where the developing cartridge 1 is attached to the drum frame 40, the developing roller 20 and the photosensitive drum 50 face each other in the third direction. Specifically, in a state where the developing cartridge 1 is attached to the drum frame 40, the outer circumferential surface of the developing roller 20 and the outer circumferential surface of the photosensitive drum 50 are in contact with each other. In a state where the process cartridge 3 is attached to the image-forming apparatus 100, the photosensitive drum 50 rotates due to a driving force supplied from the image-forming apparatus 100.

The developing agent on the outer circumferential surface of the developing roller 20 is supplied to the photosensitive drum 50 of the drum cartridge 2. At this time, the developing agent moves from the developing roller 20 to the photosensitive drum 50 corresponding to an electrostatic latent image formed on the outer circumferential surface of the photosensitive drum 50. Hence, an image with the developing agent is formed on the outer circumferential surface of the photosensitive drum 50.

The scorotron-type charger 60 is a device configured to charge the outer circumferential surface of the photosensitive drum 50. As illustrated in FIG. 1, the scorotron-type charger 60 faces the photosensitive drum 50 in the second direction. Specifically, the scorotron-type charger 60 includes a charge wire 61 and a charge grid 62. The charge wire 61 faces the outer circumferential surface of the photosensitive drum 50 in the second direction. The charge wire 61 extends in the first direction along the outer circumferential surface of the photosensitive drum 50. The charge grid 62 is positioned between the photosensitive drum 50 and the charge wire 61 in the second direction.

The image-forming apparatus 100 supplies a voltage between the charge wire 61 and the charge grid 62 in a state where the process cartridge 3 is attached to the image-forming apparatus 100. As a result, the outer circumferential surface of the photosensitive drum 50 is charged.

Figure 4:
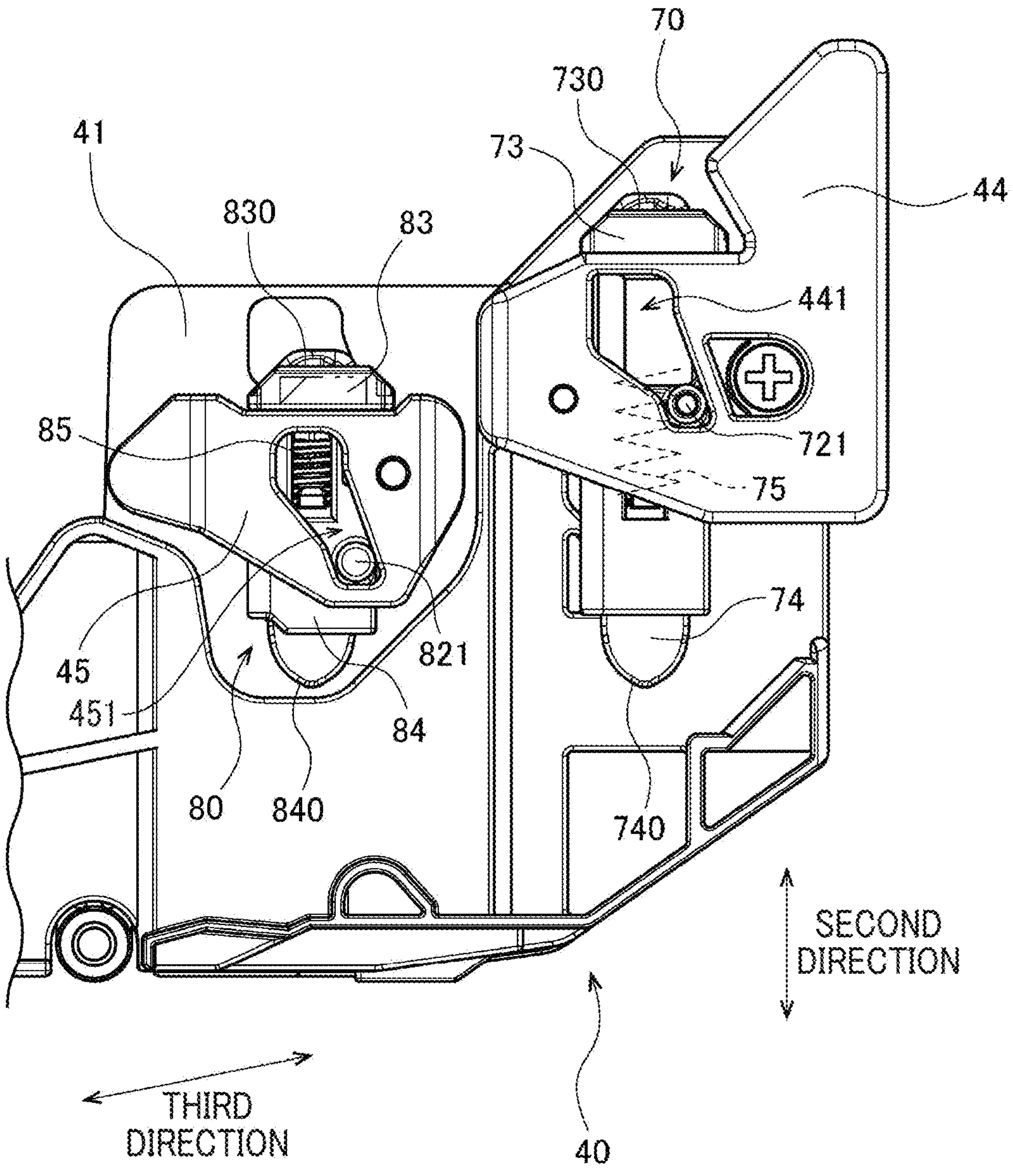
FIG. 4 is a partial side view of the drum cartridge in the vicinity of a first memory assembly and a second memory assembly.
Figure 5:
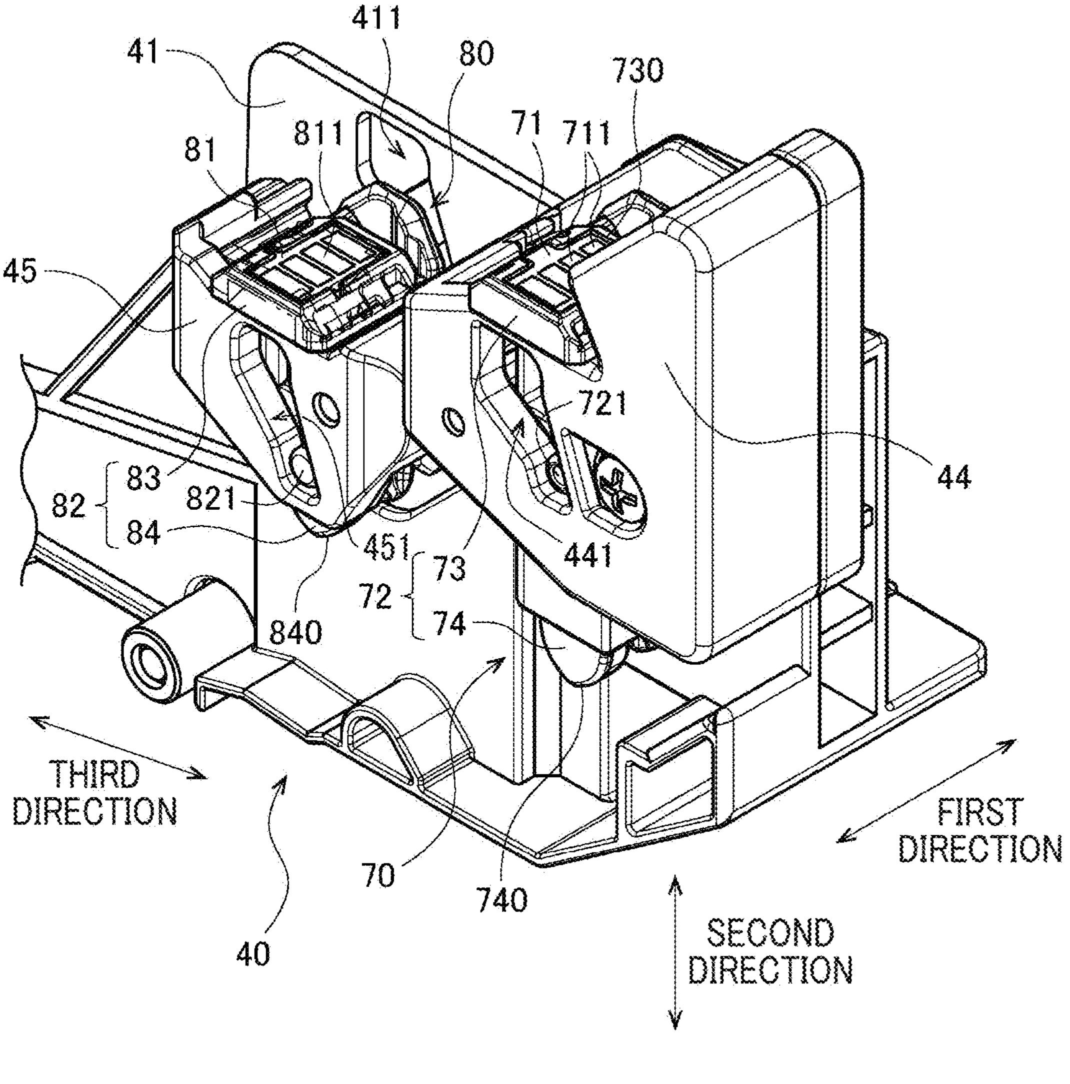
FIG. 5 is a partial perspective view of the drum cartridge in the vicinity of the first memory assembly and the second memory assembly.

FIG. 4 is a partial side view of the drum cartridge 2 in the vicinity of the first memory assembly 70 and the second memory assembly 80. FIG. 5 is a partial perspective view of the drum cartridge 2 in the vicinity of the first memory assembly 70 and the second memory assembly 80.

As illustrated in FIGS. 4 and 5, the first memory assembly 70 and the second memory assembly 80 are positioned at one end portion of the drum frame 40 in the first direction. Furthermore, the first memory assembly 70 and the second memory assembly 80 are positioned at an outer surface of the drum frame 40. Specifically, the first memory assembly 70 and the second memory assembly 80 are positioned at the outer surface of the first side frame 41. In a state where the developing cartridge 1 is attached to the drum frame 40, the first memory assembly 70 and the second memory assembly 80 are positioned on the opposite side of the developing cartridge 1 from the first side frame 41.

The first memory assembly 70 and the second memory assembly 80 are arranged in the third direction on the outer surface of the first side frame 41. The first memory assembly 70 and the second memory assembly 80 are positioned away from each other in the third direction. The second memory assembly 80 is positioned closer to the photosensitive drum 50 than the first memory assembly 70 is to the photosensitive drum 50 in the third direction.

The first memory assembly 70 includes a first memory 71 which is a storage medium, and a first holder 72 holding the first memory 71. The first memory 71 is, for example, an IC chip. The first memory 71 is positioned at an outer surface of the first holder 72. The first memory 71 stores therein information related to the drum cartridge 2. Specifically, the first memory 71 stores therein at least one of identification information and lifetime information on the drum cartridge 2. The identification information is information for identifying the drum cartridge 2. The identification information is, for example, a manufacturing number of the drum cartridge 2. The lifetime information is information indicative of a service life of the drum cartridge 2. The lifetime information is, for example, the cumulative number of revolutions of the photosensitive drum 50.

The first memory 71 has a first electrical contact surface 711. The first electrical contact surface 711 is a surface of metal which is an electric conductor. The first electrical contact surface 711 is attached to the outer surface of the first side frame 41 through the first holder 72. Hence, the first electrical contact surface 711 is positioned at the outer surface of the first side frame 41.

As illustrated in FIGS. 4 and 5, the drum frame 40 includes a first holder cover 44. The first holder cover 44 is positioned at the outer surface of the first side frame 41. Specifically, the first holder cover 44 is fixed to the outer surface of the first side frame 41 with a screw. Note that the first holder cover 44 may be fixed to the outer surface of the first side frame 41 with a bolt. The first holder 72 is positioned between the first side frame 41 and the first holder cover 44 in the first direction.

The first holder 72 includes a first boss 721 and a second boss (not illustrated). The first boss 721 extends in the first direction toward the first holder cover 44 from a surface of the first holder 72 that faces the first holder cover 44. A shape of the first boss 721 may be a circular columnar shape, or may be other shapes such as a prismatic columnar shape or the like. In the meantime, the first holder cover 44 has a first hole 441. The first hole 441 is a through-hole that penetrates the first holder cover 44 in the first direction. The first boss 721 is inserted in the first hole 441. However, the first holder cover 44 may have a recessed portion instead of the first hole 441 to allow the first boss 721 to be inserted therein.

The second boss extends in the first direction toward the first side frame 41 from a surface of the first holder 72 that faces the first side frame 41. A shape of the second boss may be a circular columnar shape, or may be other shapes such as a prismatic columnar shape or the like. In the meantime, the first side frame 41 has a second hole (not illustrated). The second hole is a through-hole that penetrates the first side frame 41 in the first direction. The second boss is inserted in the second hole. However, the first side frame 41 may have a recessed portion instead of the second hole to allow the second boss to be inserted therein.

The first hole 441 has a size (an inner dimension) in the second direction that is greater than a size (an outer dimension) of the first boss 721 in the second direction. Hence, the first boss 721 is movable in the second direction within the first hole 441. Furthermore, the second hole has a size (an inner dimension) in the second direction that is greater than a size (an outer dimension) of the second boss in the second direction. Hence, the second boss is movable in the second direction within the second hole. Accordingly, the first holder 72 is movable together with the first boss 721 and the second boss in the second direction relative to the drum frame 40 and the first holder cover 44. When the first holder 72 moves in the second direction relative to the drum frame 40, the first electrical contact surface 711 of the first memory 71 also moves in the second direction relative to the drum frame 40.

The first holder 72 has a first outer surface 730 and a second outer surface 740. The first outer surface 730 is positioned at one end of the first holder 72 in the second direction. The second outer surface 740 is positioned at another end of the first holder 72 in the second direction. The second outer surface 740 is movable in the second direction relative to the first outer surface 730.

Specifically, the first holder 72 according to the present embodiment includes a first holder member 73, a second holder member 74, and a first coil spring 75 interposed therebetween. The first holder member 73 is made of, for example, resin. The second holder member 74 is made of, for example, resin. The first holder member 73 has the first outer surface 730. The first memory 71 is fixed to the first outer surface 730. Hence, the first electrical contact surface 711 is positioned at the one end of the first holder 72 in the second direction. The second holder member 74 has the second outer surface 740. The first outer surface 730 and the second outer surface 740 are positioned away from each other in the second direction.

The first coil spring 75 is an elastic member that extends in the second direction. The first coil spring 75 is positioned in between the first outer surface 730 and the second outer surface 740 in the second direction. The first coil spring 75 expands and contracts in the second direction at least between a first state and a second state that is more contracted than the first state. The first coil spring 75 in the first state has a length in the second direction that is greater a length in the second direction of the first coil spring 75 in the second state. Hence, a distance in the second direction between the first outer surface 730 and the second outer surface 740 in the first state is greater than a distance in the second direction between the first outer surface 730 and the second outer surface 740 in the second state. Furthermore, the length in the second direction of the first coil spring 75, at least in the second state, is shorter than a natural length of the first coil spring 75.

The second memory assembly 80 includes a second memory 81 which is a storage medium and a second holder 82 holding the second memory 81. The second memory 81 is, for example, an IC chip. The second memory 81 is positioned at the outer surface of the second holder 82. The second memory 81 stores therein information related to the developing cartridge 1. Specifically, the second memory 81 stores therein at least one of identification information and lifetime information on the developing cartridge 1. The identification information is information for identifying the developing cartridge 1. The identification information is, for example, manufacturing number of the developing cartridge 1. The lifetime information is information indicative of a service life of the developing cartridge 1. The lifetime information is, for example, the cumulative number of revolutions of the developing roller 20.

The second memory 81 has a second electrical contact surface 811 different from the first electrical contact surface 711. The second electrical contact surface 811 is a surface of metal which is an electric conductor. The second electrical contact surface 811 is attached to the outer surface of the first side frame 41 through the second holder 82. Hence, the second electrical contact surface 811 is positioned at the outer surface of the first side frame 41.

As illustrated in FIGS. 4 and 5, the drum frame 40 includes a second holder cover 45. The second holder cover 45 is positioned at the outer surface of the first side frame 41. Specifically, the second holder cover 45 is fixed to the outer surface of the first side frame 41 with a screw. Note that the second holder cover 45 may be fixed to the outer surface of the first side frame 41 with a bolt. The second holder 82 is positioned between the first side frame 41 and the second holder cover 45 in the first direction.

The second holder 82 includes a third boss 821 and a fourth boss (not illustrated). The third boss 821 extends in the first direction toward the second holder cover 45 from a surface of the second holder 82 that faces the second holder cover 45. A shape of the third boss 821 may be a circular columnar shape, or may be other shapes such as a prismatic columnar shape or the like. In the meantime, the second holder cover 45 has a third hole 451. The third hole 451 is a through-hole that penetrates the second holder cover 45 in the first direction. The third boss 821 is inserted in the third hole 451. However, the second holder cover 45 may have a recessed portion instead of the third hole 451 to allow the third boss 821 to be inserted therein.

The fourth boss extends in the first direction toward the first side frame 41 from a surface of the second holder 82 that faces the first side frame 41. A shape of the fourth boss may be a circular columnar shape, or may be other shapes such as a prismatic columnar shape or the like. In the meantime, the first side frame 41 has a fourth hole 411. The fourth hole 411 is a through-hole that penetrates the first side frame 41 in the first direction. The fourth boss is inserted in the fourth hole 411. However, the first side frame 41 may have a recessed portion instead of the fourth hole 411 to allow the fourth boss to be inserted therein.

The third hole 451 has a size (an inner dimension) in the second direction greater than a size (an outer dimension) of the third boss 821 in the second direction. Hence, the third boss 821 is movable in the second direction within the third hole 451. Furthermore, the fourth hole 411 has a size (an inner dimension) in the second direction greater than a size (an outer dimension) of the fourth boss in the second direction. Hence, the fourth boss is movable in the second direction within the fourth hole 411. Accordingly, the second holder 82 is movable in the second direction together with the third boss 821 and the fourth boss relative to the drum frame 40 and the second holder cover 45. When the second holder 82 moves in the second direction relative to the drum frame 40, the second electrical contact surface 811 of the second memory 81 also moves in the second direction relative to the drum frame 40.

The second holder 82 has a third outer surface 830 and a fourth outer surface 840. The third outer surface 830 is positioned at one end of the second holder 82 in the second direction. The fourth outer surface 840 is positioned at another end of the second holder 82 in the second direction. The fourth outer surface 840 is movable in the second direction relative to the third outer surface 830.

Specifically, the second holder 82 according to the present embodiment includes a third holder member 83, a fourth holder member 84, and a second coil spring 85 interposed therebetween. The third holder member 83 is made of, for example, resin. The fourth holder member 84 is made of, for example, resin. The third holder member 83 has the third outer surface 830. The second memory 81 is fixed to the third outer surface 830. Hence, the second electrical contact surface 811 is positioned at the one end of the second holder 82 in the second direction. The fourth holder member 84 has the fourth outer surface 840. The third outer surface 830 and the fourth outer surface 840 are positioned away from each other in the second direction.

The second coil spring 85 is an elastic member that extends in the second direction. The second coil spring 85 is positioned between the third outer surface 830 and the fourth outer surface 840 in the second direction. The second coil spring 85 expands and contracts in the second direction at least between a third state and a fourth state that is more contracted than the third state. The second coil spring 85 in the third state has a length in the second direction that is greater than a length in the second direction of the second coil spring 85 in the fourth state. Hence, a distance in the second direction between the third outer surface 830 and the fourth outer surface 840 in the third state is greater than a distance in the second direction between the third outer surface 830 and the fourth outer surface 840 in the fourth state. Further, the length in the second direction of the second coil spring 85, at least in the fourth state, is shorter than a natural length of the second coil spring 85.

The lock lever 90 is positioned at the other end portion of the drum frame 40 in the first direction. Specifically, the lock lever 90 is positioned at the second side frame 42. The lock lever 90 is pivotally movable about a pivot axis extending in the first direction between a lock position and a release position. The lock lever 90 is positioned at the lock position when the developing cartridge 1 is attached to the drum frame 40. Hence, the developing cartridge 1 is locked relative to the drum frame 40. Furthermore, when the lock lever 90 pivotally moves from the lock position to the release position in a state where the developing cartridge 1 is attached to the drum frame 40, lock of the developing cartridge 1 relative to the drum frame 40 is released.

<4. Attachment Operation of Process Cartridge>

The image-forming apparatus 100 has an opening 101 allowing the process cartridge 3 to pass therethrough, and includes a main cover 102. The main cover 102 pivotally moves between a closed position in which the main cover 102 covers the opening 101 of the image-forming apparatus 100 and an open position in which the main cover 102 opens the opening 101 of the image-forming apparatus 100. When the process cartridge 3 is attached to the image-forming apparatus 100, the main cover 102 is positioned at the open position, and the process cartridge 3 passes through the opening 101 and is attached to an inside of the image-forming apparatus 100. At this time, the process cartridge 3 moves in the third direction.

As illustrated in FIG. 1, the image-forming apparatus 100 includes a first guide frame 103, a second guide frame 104, a first electrical connector 105, and a second electrical connector 106. Each of the first guide frame 103 and the second guide frame 104 extends in the third direction. The first guide frame 103 and the second guide frame 104 face each other in the second direction. Furthermore, a gap in the second direction between the first guide frame 103 and the second guide frame 104 decreases as extending away from the opening 101 in the third direction.

The first electrical connector 105 and the second electrical connector 106 are positioned at the first guide frame 103. The first electrical connector 105 and the second electrical connector 106 are arranged to be spaced apart from each other in the third direction. The first electrical connector 105 is a terminal that can make contact with the first electrical contact surface 711 of the first memory 71. The second electrical connector 106 is a terminal that can make contact with the second electrical contact surface 811 of the second memory 81. The first electrical connector 105 and the second electrical connector 106 are electrically connected to a controller 107 of the image-forming apparatus 100.

When the process cartridge 3 is attached to the image-forming apparatus 100, the third outer surface 830 of the second holder 82 makes contact with the first guide frame 103, and the fourth outer surface 840 of the second holder 82 makes contact with the second guide frame 104. The second holder 82 moves in the second direction relative to the drum frame 40 as the second holder 82 is guided by the first guide frame 103 and the second guide frame 104 while moving in the third direction. Furthermore, since the gap in the second direction between the first guide frame 103 and the second guide frame 104 is gradually reduced, the distance in the second direction between the third outer surface 830 and the fourth outer surface 840 also becomes gradually reduced.

When attachment of the process cartridge 3 to the image-forming apparatus 100 is completed, the second electrical contact surface 811 of the second memory 81 makes contact with the second electrical connector 106. As such, the controller 107 of the image-forming apparatus 100 can read information from the second memory 81 and write information into the second memory 81.

When the process cartridge 3 is attached to the image-forming apparatus 100, the first outer surface 730 of the first holder 72 makes contact with the first guide frame 103, and the second outer surface 740 of the first holder 72 makes contact with the second guide frame 104. The first holder 72 moves in the second direction as the first holder 72 is guided by the first guide frame 103 and the second guide frame 104 while moving in the third direction. Furthermore, since the gap in the second direction between the first guide frame 103 and the second guide frame 104 is gradually reduced, the distance in the second direction between the first outer surface 730 and the second outer surface 740 also becomes gradually reduced.

When attachment of the process cartridge 3 to the image-forming apparatus 100 is completed, the first electrical contact surface 711 of the first memory 71 makes contact with the first electrical connector 105. As such, the controller 107 of the image-forming apparatus 100 can read information from the first memory 71 and write information into the first memory 71.

As described above, the drum cartridge 2 according to the present embodiment includes the first memory 71 and the second memory 81. The first memory 71 stores therein information related to the drum cartridge 2. The second memory 81 stores therein information related to the developing cartridge 1. In this way, when two memories 71 and 81 are installed on the drum cartridge 1, information related to the developing cartridge 1 can be managed without installing a memory on the developing cartridge 1. That is, in a state where the process cartridge 3 is attached to the image-forming apparatus 100, the controller 107 of the image-forming apparatus 100 can read information related to the developing cartridge 1 from the second memory 81 and perform a printing process using this information.

Furthermore, with the structure of the present embodiment, the second electrical contact surface 811 of the second memory 81 storing information related to the developing cartridge 1 is attached not to the casing 10 of the developing cartridge 1 but to the drum frame 40. This allows the second electrical contact surface 811 to be positioned with respect to the image-forming apparatus 100 regardless of the attachment tolerances of the developing cartridge 1 to the drum frame 40. Accordingly, the second electrical contact surface 811 can be accurately positions with respect to the second electrical connector 106 of the image-forming apparatus 100.

Furthermore, with the structure of the present embodiment, both the first electrical contact surface 711 and the second electrical contact surface 811 are positioned at one end of the drum frame 40 in the first direction. Hence, the dimensions of the drum cartridge 2 in the first direction can be reduced in comparison with the case that the first electrical contact surface 711 and the second electrical contact surface 811 are separately arranged at both ends of the drum frame 40 in the first direction.

Furthermore, with the structure of the present embodiment, the drum cartridge 2 further includes a lock lever 90. The lock lever 90 is configured to release lock of the developing cartridge 1 relative to the drum frame 40. The lock lever 90 is positioned at the other end portion of the drum frame 40 in the first direction.

Furthermore, with the structure of the present embodiment, the drum frame 40 includes a first side frame 41 and a second side frame 42. The first side frame 41 is positioned at one end portion of the drum frame 40 in the first direction. The second frame 42 is positioned at the other end portion of the drum frame 40 in the first direction. The photosensitive drum 50 is positioned between the first side frame 41 and the second side frame 42 in the first direction. The first electrical contact surface 711 and the second electrical contact surface 811 are positioned on an opposite side of the developing cartridge 1 from the first side frame 41 in a state where the developing cartridge 1 is attached to the drum frame 40.

Furthermore, with the structure of the present embodiment, the drum cartridge 2 further includes a first holder 72. The first holder 72 holds the first electrical contact surface 711 such that the first electrical contact surface 711 is movable relative to the drum frame 40. The first electrical contact surface 711 is attached to the outer surface of the drum frame 40 through the first holder 72.

Furthermore, with the structure of the present embodiment, the first electrical contact surface 711 is positioned at one end of the first holder 72 in a second direction crossing the first direction. The first holder 72 holds the first electrical contact surface 711 such that the first electrical contact surface 711 is movable in the second direction relative to the drum frame 40.

Furthermore, with the structure of the present embodiment, the drum cartridge 2 further includes a scorotron-type charger 60. The scorotron-type charger 60 is configured to charge a surface of the photosensitive drum 50. The scorotron-type charger 60 faces the photosensitive drum 50 in the second direction.

Furthermore, with the structure of the present embodiment, the first holder 72 holds the first memory 71.

Furthermore, with the structure of the present embodiment, the drum cartridge 2 further includes a second holder 82. The second holder 82 holds the second electrical contact surface 811 such that the second electrical contact surface 811 is movable relative to the drum frame 40. The second electrical contact surface 811 is attached to the outer surface of the drum frame 40 through the second holder 82.

Furthermore, with the structure of the present embodiment, the second electrical contact surface 811 is positioned at one end of the second holder 82 in a second direction crossing the first direction. The second holder 82 holds the second electrical contact surface 811 such that the second electrical contact surface 811 is movable in the second direction relative to the drum frame 40.

Furthermore, with the structure of the present embodiment, the second holder 82 holds the second memory 81.

Furthermore, with the structure of the present embodiment, the drum frame 40 includes a first side frame 41 and a second side frame 42. The first side frame 41 is positioned at one end portion of the drum frame 40 in the first direction. The second side frame 42 is positioned at the other end portion of the drum frame 40 in the first direction. The first electrical contact surface 711 and the second electrical contact surface 811 are positioned on an opposite side of the developing cartridge 1 from the first side frame 41 in the first direction in a state where the developing cartridge 1 is attached to the drum frame 40.

Furthermore, with the structure of the present embodiment, the second holder 82 includes a third boss 821 and a fourth boss extending in the first direction. The first side frame 41 has a hole 411 or a recessed portion in which the fourth boss is inserted. The fourth boss is movable within the hole 411 or the recessed portion.

Furthermore, with the structure of the present embodiment, the photosensitive drum 50 is positioned at one end of the drum frame 40 in a third direction crossing the first direction. The first electrical contact surface 711 and the second electrical contact surface 811 are arranged in the third direction.

Furthermore, with the structure of the present embodiment, the photosensitive drum 50 faces the developing roller 20 in the third direction in a state where the developing cartridge 1 is attached to the drum frame 40.

Furthermore, with the structure of the present embodiment, the first electrical contact surface 711 and the second electrical contact surface 811 are arranged to be spaced apart from each other in the third direction.

Furthermore, with the structure of the present embodiment, the second electrical contact surface 811 is positioned closer to the photosensitive drum 50 than the first electrical contact surface 711 is to the photosensitive drum 50 in the third direction.

<5. Modifications>

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the embodiment described above, the first holder 72 holds the first memory 71. However, the first holder 72 may hold only the first electrical contact surface 711 of the first memory 71. In this case, a portion of the first memory 71 other than the first electrical contact surface 711 may be held by another portion of the drum cartridge 2.

Furthermore, in the embodiment described above, the first electrical contact surface 711 is attached to the drum frame 40 through the first holder 72. However, the first electrical contact surface 711 may be directly attached to the drum frame 40 without any other components.

Furthermore, in the embodiment described above, the second holder 82 holds the second memory 81. However, the second holder 82 may hold only the second electrical contact surface 811 of the second memory 81. In this case, a portion of the second memory 81 other than the second electrical contact surface 811 may be held by another portion of the drum cartridge 2.

Furthermore, in the embodiment described above, the second electrical contact surface 811 is attached to the drum frame 40 through the second holder 82. However, the second electrical contact surface 811 may be directly attached to the drum frame 40 without any other components.

Furthermore, in the embodiment described above, the single process cartridge 3 is attached to the single image-forming apparatus 100. However, a plurality of process cartridges 3 may be attached to the single image-forming apparatus 100.

Furthermore, in the embodiment described above, the single developing cartridge 1 is attached to the drum cartridge 2. However, a plurality of developing cartridges 1 may be attached to the drum cartridge.

Furthermore, a detailed shape of the drum cartridge may be different from the shape illustrated in each drawing of the present application. Furthermore, each component appearing in the embodiment and the modifications described above may be suitably combined as long as any contradiction is avoided.

What is claimed is:

1. A drum cartridge comprising:

a drum frame to which a developing cartridge including a developing roller is attachable;

a photosensitive drum rotatable about a first axis extending in a first direction, the photosensitive drum being configured to contact the developing roller in a state where the developing cartridge is attached to the drum frame;

a first memory having a first electrical contact surface, the first memory storing therein information related to the drum cartridge; and a second memory having a second electrical contact surface different from the first electrical contact surface, the second memory storing therein information related to the developing cartridge, wherein the first electrical contact surface and the second electrical contact surface are positioned at an outer surface of the drum frame.

2. The drum cartridge according to claim 1, wherein the first electrical contact surface and the second electrical contact surface are positioned at one end portion of the drum frame in the first direction.

3. The drum cartridge according to claim 2, further comprising:

a lock lever configured to release lock of the developing cartridge relative to the drum frame, the lock lever being positioned at another end portion of the drum frame in the first direction.

4. The drum cartridge according to claim 2, wherein the drum frame includes:

a first side frame positioned at the one end portion of the drum frame in the first direction; and a second side frame positioned at another end portion of the drum frame in the first direction, wherein the photosensitive drum is positioned between the first side frame and the second side frame in the first direction, and wherein the first electrical contact surface and the second electrical contact surface are positioned on an opposite side of the developing cartridge from the first side frame in a state where the developing cartridge is attached to the drum frame.

5. The drum cartridge according to claim 1, further comprising:

a first holder holding the first electrical contact surface such that the first electrical contact surface is movable relative to the drum frame, wherein the first electrical contact surface is attached to the outer surface of the drum frame through the first holder.

6. The drum cartridge according to claim 5, wherein the first electrical contact surface is positioned at one end of the first holder in a second direction crossing the first direction, and wherein the first holder holds the first electrical contact surface such that the first electrical contact surface is movable in the second direction relative to the drum frame.

7. The drum cartridge according to claim 6, further comprising:

a scorotron-type charger configured to charge a surface of the photosensitive drum, the scorotron-type charger facing the photosensitive drum in the second direction.

8. The drum cartridge according to claim 5, wherein the first holder holds the first memory.

9. The drum cartridge according to claim 1, further comprising:

a second holder holding the second electrical contact surface such that the second electrical contact surface is movable relative to the drum frame, wherein the second electrical contact surface is attached to the outer surface of the drum frame through the second holder.

10. The drum cartridge according to claim 9, wherein the second electrical contact surface is positioned at one end of the second holder in a second direction crossing the first direction, and wherein the second holder holds the second electrical contact surface such that the second electrical contact surface is movable in the second direction relative to the drum frame.

11. The drum cartridge according to claim 10, further comprising:

a scorotron-type charger configured to charge a surface of the photosensitive drum, the scorotron-type charger facing the photosensitive drum in the second direction.

12. The drum cartridge according to claim 9, wherein the second holder holds the second memory.

13. The drum cartridge according to claim 9, wherein the drum frame includes:

a first side frame positioned at one end portion of the drum frame in the first direction; and a second side frame positioned at another end portion of the drum frame in the first direction, and wherein the first electrical contact surface and the second electrical contact surface are positioned on an opposite side of the developing cartridge from the first side frame in the first direction in a state where the developing cartridge is attached to the drum frame.

14. The drum cartridge according to claim 13, wherein the second holder includes a boss extending in the first direction, wherein the first side frame has a hole or a recessed portion in which the boss is inserted, and wherein the boss is movable within the hole or the recessed portion.

15. The drum cartridge according to claim 1, wherein the photosensitive drum is positioned at one end of the drum frame in a third direction crossing the first direction, and wherein the first electrical contact surface and the second electrical contact surface are arranged in the third direction.

16. The drum cartridge according to claim 15, wherein the photosensitive drum faces the developing roller in the third direction in a state where the developing cartridge is attached to the drum frame.

17. The drum cartridge according to claim 15, wherein the first electrical contact surface and the second electrical contact surface are arranged to be spaced apart from each other in the third direction.

18. The drum cartridge according to claim 15, wherein the second electrical contact surface is positioned closer to the photosensitive drum than the first electrical contact surface is to the photosensitive drum in the third direction.

19. A process cartridge attachable to an image-forming apparatus, the process cartridge comprising:

a developing cartridge comprising:

a developing roller; and a drum cartridge comprising:

a drum frame to which the developing cartridge is attachable;

a photosensitive drum rotatable about a first axis extending in a first direction, the photosensitive drum being configured to contact the developing roller in a state where the developing cartridge is attached to the drum frame;

a first memory having a first electrical contact surface, the first memory storing therein information related to the drum cartridge; and a second memory having a second electrical contact surface different from the first electrical contact surface, the second memory storing therein information related to the developing cartridge, wherein the first electrical contact surface and the second electrical contact surface are positioned at an outer surface of the drum frame.

* * * * *